(12) United States Patent
Hasegawa et al.

(10) Patent No.: US 11,233,269 B2
(45) Date of Patent: Jan. 25, 2022

(54) ALL-SOLID-STATE BATTERY WITH VARIED BINDER CONCENTRATION

(71) Applicant: Panasonic Intellectual Property Management Co., Ltd., Osaka (JP)

(72) Inventors: Kenta Hasegawa, Osaka (JP); Takao Kuromiya, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 317 days.

(21) Appl. No.: 15/873,175

(22) Filed: Jan. 17, 2018

(65) Prior Publication Data
US 2018/0226681 A1 Aug. 9, 2018

(30) Foreign Application Priority Data
Feb. 3, 2017 (JP) .............................. JP2017-018891

(51) Int. Cl.
*H01M 10/0565* (2010.01)
*H01M 4/62* (2006.01)
(Continued)

(52) U.S. Cl.
CPC ....... *H01M 10/0565* (2013.01); *H01M 4/621* (2013.01); *H01M 4/624* (2013.01);
(Continued)

(58) Field of Classification Search
CPC ............. H01M 10/0565; H01M 4/621; H01M 10/0562; H01M 10/052; H01M 4/624;
(Continued)

(56) References Cited

U.S. PATENT DOCUMENTS

| 2007/0292750 A1 | 12/2007 | Beard |
|---|---|---|
| 2009/0214957 A1 | 8/2009 | Okada et al. |

(Continued)

FOREIGN PATENT DOCUMENTS

| CN | 104078649 A | 10/2014 |
|---|---|---|
| CN | 105742697 A | 7/2016 |

(Continued)

OTHER PUBLICATIONS

Machine translation of JP 5686130, Saito et al., 2015 (Year: 2015).*

(Continued)

*Primary Examiner* — Kwang Han
(74) *Attorney, Agent, or Firm* — Pearne & Gordon LLP

(57) ABSTRACT

An all-solid-state battery includes a positive-electrode current collector, a positive electrode layer, a negative-electrode current collector, a negative electrode layer, and a solid electrolyte layer. The positive electrode layer is formed on the positive-electrode current collector and includes a positive-electrode material mixture layer which includes at least a positive-electrode active material and a binder. The negative electrode layer is formed on the negative-electrode current collector and includes a negative-electrode material mixture layer which includes at least a negative-electrode active material and a binder. The solid electrolyte layer is disposed between the positive-electrode material mixture layer and the negative-electrode material mixture layer, and includes at least a solid electrolyte having ion conductivity.

1 Claim, 4 Drawing Sheets

(51) Int. Cl.
*H01M 10/0562* (2010.01)
*H01M 4/02* (2006.01)
*H01M 10/052* (2010.01)

(52) U.S. Cl.
CPC ..... *H01M 10/052* (2013.01); *H01M 10/0562* (2013.01); *H01M 2004/021* (2013.01); *H01M 2004/027* (2013.01); *H01M 2004/028* (2013.01); *H01M 2300/0065* (2013.01)

(58) Field of Classification Search
CPC ... H01M 2004/021; H01M 2300/0065; H01M 2004/028; H01M 2004/027; Y02E 60/10; Y02P 70/50
See application file for complete search history.

(56) References Cited

U.S. PATENT DOCUMENTS

| | | | | |
|---|---|---|---|---|
| 2012/0214063 | A1* | 8/2012 | Morimoto | H01M 4/131 429/211 |
| 2014/0295248 | A1* | 10/2014 | Hotta | H01M 4/13 429/156 |
| 2015/0340741 | A1 | 11/2015 | Kim et al. | |
| 2016/0190546 | A1* | 6/2016 | Yoon | H01M 4/13 429/233 |

FOREIGN PATENT DOCUMENTS

| | | | | |
|---|---|---|---|---|
| JP | 9-237623 | | 9/1997 | |
| JP | 3482443 | B2 | 12/2003 | |
| JP | 2009-224318 | | 10/2009 | |
| JP | 2009-252629 | A | 10/2009 | |
| JP | 2010-219056 | A | 9/2010 | |
| JP | 2013-080719 | A | 5/2013 | |
| JP | 5686130 | * | 1/2015 | .......... H01M 10/058 |
| JP | 56488605 | | 1/2015 | |
| JP | 56861305 | | 3/2015 | |
| JP | 2015-179565 | A | 10/2015 | |
| JP | 2015-225855 | | 12/2015 | |
| WO | 2011/058981 | A1 | 5/2011 | |
| WO | 2014/083950 | A1 | 6/2014 | |

OTHER PUBLICATIONS

The Extended European Search Report dated May 3, 2018 for the related European Patent Application No. 17207396.7.
The Extended European Search Report dated Sep. 16, 2019 for the related European Patent Application No. 17207396.7.
English translation of WO 2014/083950 A1, Hitachi Ltd., corresponding to JPWO2014/083950A1, which was previously submitted to USPTO with an English Abstract.
Partial English Translation of Chinese Search Report dated Nov. 17, 2021 for the related Chinese Patent Application No. 201810075259.0.

* cited by examiner

ALL-SOLID-STATE BATTERY WITH VARIED BINDER CONCENTRATION

BACKGROUND

1. Technical Field

The disclosure relates to a positive electrode layer, a negative electrode layer, a solid electrolyte layer, and an all-solid-state battery using the layers.

2. Description of the Related Art

Recently, development of a secondary battery which can be used repeatedly is required with reduction in weight of electronic equipment such as a personal computer or a portable phone and manufacturing of cordless electronic equipment. As the secondary battery, a Ni—Cd battery, a Ni-MH battery, a lead storage battery, a Li-ion battery, and the like are provided. The Li-ion battery concentrates attentions because of characteristics of a light weight, a high voltage, and high energy density.

The Li-ion battery includes a positive electrode layer, a negative electrode layer, and an electrolyte which is disposed between the positive electrode layer and the negative electrode layer. As the electrolyte, an electrolytic solution or a solid electrolyte in which a supporting salt, for example, lithium hexafluorophosphate is dissolved in an organic solvent is used. A Li-ion battery which is currently used widely has flammability because an electrolytic solution including an organic solvent is used. Therefore, a material, a structure, and a system for securing safety are required. Regarding this, it is expected that it is possible to simplify the material, the structure, and the system by using a nonflammable solid electrolyte as the electrolyte, and it is considered that it is possible to increase energy density, reduce manufacturing cost, and to improve productivity. It is assumed below that a Li-ion battery using a solid electrolyte is referred to as an "all-solid-state battery".

The solid electrolyte can be roughly classified into an organic solid electrolyte and an inorganic solid electrolyte. The organic solid electrolyte has ion conductivity of about $10^{-6}$ S/cm at 25° C. and this value is much lower than $10^{-3}$ S/cm which is ion conductivity of the electrolytic solution. Therefore, it is difficult to operate an all-solid-state battery using an organic solid electrolyte, in an environment of 25° C. As the inorganic solid electrolyte, an oxide-based solid electrolyte and a sulfide-based solid electrolyte are provided. Ion conductivity of each of the solid electrolytes is $10^{-4}$ to $10^{-3}$ S/cm. The oxide-based solid electrolyte has large particle boundary resistance. As a method of decreasing the particle boundary resistance, sintering of powder or thinning is examined. However, in a case of performing sintering, a constituent element of a positive electrode or a negative electrode and a constituent element of a solid electrolyte are mutually diffused by treatment at a high temperature. Thus, it is difficult to obtain sufficient characteristics. Therefore, regarding an all-solid-state battery using an oxide-based solid electrolyte, examination in a thin film is the mainstream. Since the sulfide-based solid electrolyte has particle boundary resistance smaller than that of the oxide-based solid electrolyte, favorable characteristics are obtained only in a case of compression molding of powder. Thus, research has proceeded actively in recent years.

A coating type all-solid-state battery includes a positive electrode layer, a negative electrode layer, and a solid electrolyte layer. The positive electrode layer is formed on a current collector formed by a metal foil and includes a positive-electrode active material, a solid electrolyte, and a binder. The negative electrode layer is formed on a current collector formed by a metal foil and includes a negative-electrode active material, a solid electrolyte, and a binder. The solid electrolyte layer is disposed between the positive electrode layer and the negative electrode layer, and includes a solid electrolyte and a binder. The coating type all-solid-state battery is manufactured in a manner that slurry is obtained from the material of each of the positive electrode layer, the negative electrode layer, and the solid electrolyte layer by using an organic solvent, and a film is formed on a metal foil by using the slurry. However, when the organic solvent is dried, the large amount of the organic solvent is released. Thus, the coating type all-solid-state battery is not preferable on an environment.

Japanese Patent No. 5686130 discloses a manufacturing method of an all-solid-state battery using a low environmental load type slurry which contains a positive-electrode active material, a negative-electrode active material, a solid electrolyte, and a binder which are materials of the positive electrode layer, the negative electrode layer, and the solid electrolyte layer, without containing an organic solvent. Japanese Patent Unexamined Publication No. 2015-225855 discloses a manufacturing method of an all-solid-state battery in which continuous concentration gradient of electrode materials is formed in a thickness direction of the all-solid-state battery in a manner that the proportion of the solid electrolyte is set to be increased as being closer to a solid electrolyte interface and the proportion of the active material is set to be increased as being closer to a current collector interface, by using an aerosol position method.

SUMMARY

According to an all-solid-state battery according to an exemplary embodiment of the disclosure. The all-solid-state battery includes a positive-electrode current collector, a positive electrode layer, a negative-electrode current collector, a negative electrode layer, and a solid electrolyte layer. The positive electrode layer is formed on the positive-electrode current collector and includes a positive-electrode material mixture layer which includes at least a positive-electrode active material and a binder. The negative electrode layer is formed on the negative-electrode current collector and includes a negative-electrode material mixture layer which includes at least a negative-electrode active material and a binder. The solid electrolyte layer is disposed between the positive-electrode material mixture layer and the negative-electrode material mixture layer, and includes at least a solid electrolyte having ion conductivity. Concentration of a solvent included in at least one layer selected from the group consisting of the positive-electrode material mixture layer, the negative-electrode material mixture layer, and the solid electrolyte layer is equal to or smaller than 50 ppm. Regarding concentration of the binder included in at least one layer selected from the positive-electrode material mixture layer and the negative-electrode material mixture layer, the concentration in proximity to the negative-electrode current collector or the concentration in proximity to the positive-electrode current collector is higher than the concentration in proximity to the solid electrolyte layer.

According to the disclosure, there is provided an all-solid-state battery in which an environmental load is small and

DETAILED DESCRIPTION

Figure 1:
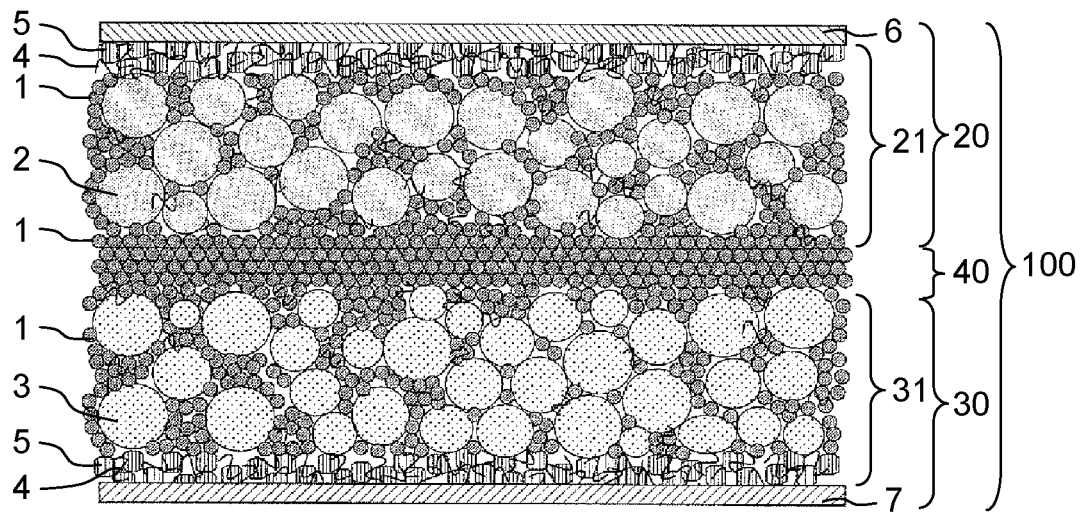
FIG. 1 is a schematic sectional view illustrating an all-solid-state battery according to an exemplary embodiment.

Ahead of descriptions of an exemplary embodiment, a problem in the related art will be briefly described.

In the manufacturing method disclosed in Japanese Patent No. 5686130, it is possible to obtain an all-solid-state battery having a small environmental load by not using an organic solvent in slurry. However, adhesion strength is not sufficiently obtained. In order to secure sufficient adhesion strength, adding a large amount of the binder is required. However, the binder hinders lithium ion conduction and electron conduction. Thus, charging-and-discharging characteristics are deteriorated. In the manufacturing method disclosed in Japanese Patent Unexamined Publication No. 2015-225855, in the manufactured all-solid-state battery, the solid electrolyte and the electrode materials such as active materials are disposed so as to have concentration gradient. Thus, more ions are diffused, and it is possible to improve output performance and to achieve an increase of capacity of a battery. However, since the binder is not included, sufficient adhesion strength is not obtained.

Considering the above problems, an object of the disclosure is to provide an all-solid-state battery in which an environmental load is small and both high adhesion strength and excellent battery characteristics are achieved.

Hereinafter, an all-solid-state battery according to the exemplary embodiment of the disclosure will be described with reference to the drawings. The following exemplary embodiment describes just a specific example of the disclosure. Numerical values, shapes, materials, constituent components, positions of the constituent components, a connection form thereof, and the like are just an example, and are not limited to the disclosure. Regarding a constituent component which is not described in the independent claim which describes the top concept of the disclosure, among constituent components in the following exemplary embodiment, a certain constituent component will be described.

The drawings are schematic diagrams and are not necessarily and strictly illustrated. In the drawings, the substantially same components are denoted by the same reference signs, and repetitive descriptions may be omitted or simplified.

EXEMPLARY EMBODIMENT

Hereinafter, an all-solid-state battery according to the exemplary embodiment, and a positive electrode layer, a negative electrode layer, and a solid electrolyte layer which constitute the all-solid-state battery will be described in detail with reference to the drawings.

A. All-Solid-State Battery

All-solid-state battery 100 according to the exemplary embodiment will be described with reference to FIG. 1. FIG. 1 is a schematic sectional view illustrating all-solid-state battery 100 according to the exemplary embodiment.

As illustrated in FIG. 1, all-solid-state battery 100 according to the exemplary embodiment includes, for example, positive-electrode current collector 6, positive electrode layer 20, negative-electrode current collector 7, negative electrode layer 30, and solid electrolyte layer 40. Positive electrode layer 20 is formed on positive-electrode current collector 6 and includes positive-electrode material mixture layer 21 which includes solid electrolyte 1, positive-electrode active material 2, binder 4, and conductive assistant 5. Negative electrode layer 30 is formed on negative-electrode current collector 7 and includes negative-electrode material mixture layer 31 which includes solid electrolyte 1, negative-electrode active material 3, binder 4, and conductive assistant 5. Solid electrolyte layer 40 is disposed between positive-electrode material mixture layer 21 and negative-electrode material mixture layer 31, and includes at least solid electrolyte 1 having ion conductivity. Positive-electrode material mixture layer 21 and negative-electrode material mixture layer 31 are produced on positive-electrode current collector 6 and negative-electrode current collector 7 which are formed by a metal foil, respectively.

Since details of positive electrode layer 20, negative electrode layer 30, and solid electrolyte layer 40 will be described later, descriptions thereof will be omitted.

A-1. Binder

In all-solid-state battery 100 according to the exemplary embodiment, regarding concentration of binder 4 included in positive-electrode material mixture layer 21, the concentration of binder 4 in proximity to positive-electrode current collector 6 is higher than that in proximity to solid electrolyte layer 40. Preferably, the concentration of binder 4 in proximity to positive-electrode current collector 6 is equal to or greater than 10 times the concentration of binder 4 in proximity to solid electrolyte layer 40. More preferably, the binder is not provided in proximity to solid electrolyte layer 40.

Regarding concentration of binder 4 included in negative-electrode material mixture layer 31, the concentration thereof in proximity to negative-electrode current collector 7 is higher than that in proximity to solid electrolyte layer 40. Preferably, the concentration of binder 4 in proximity to negative-electrode current collector 7 is equal to or greater than 10 times the concentration of binder 4 in proximity to solid electrolyte layer 40. More preferably, the binder is not provided in proximity to solid electrolyte layer 40.

Thus, adhesiveness between positive-electrode material mixture layer 21 and positive-electrode current collector 6 and adhesiveness between negative-electrode material mixture layer 31 and negative-electrode current collector 7 are improved. In addition, it is possible to prevent peeling-off of positive-electrode material mixture layer 21 from positive-electrode current collector 6 and peeling-off of negative-electrode material mixture layer 31 from negative-electrode current collector 7, even though positive-electrode material mixture layer 21 and negative-electrode material mixture layer 31 are expanded or shrunk with charging and discharging all-solid-state battery 100. Therefore, it is possible to improve lifespan characteristics of the charge and discharge cycle of all-solid-state battery 100, and to obtain high adhesion strength and excellent battery characteristics. Here, a phrase that binder 4 is not provided means that the content of binder 4 is equal to or smaller than 100 ppm.

In this specification, the concentration is not limited so long as particular statements are not made, and is concentration on the basis of the weight.

A-2. Conductive Assistant

In all-solid-state battery 100 according to the exemplary embodiment, regarding concentration of conductive assistant 5 included in positive-electrode material mixture layer 21, the concentration of conductive assistant 5 in proximity to positive-electrode current collector 6 is higher than that in proximity to solid electrolyte layer 40. Preferably, the concentration of conductive assistant 5 in proximity to positive-electrode current collector 6 is equal to or greater than 10 times of the concentration of conductive assistant 5 in proximity to solid electrolyte layer 40. When all-solid-state battery 100 is charged or discharged, the amount of electron conduction occurring is larger than the amount of lithium ion conduction occurring in proximity to positive-electrode current collector 6. Therefore, the concentration of conductive assistant 5 in proximity to positive-electrode current collector 6 may be set to be high. Thus, it is possible to improve electron conductivity of positive electrode layer 20 during charging or discharging, and favorable charging-and-discharging characteristics are obtained.

Similar to positive electrode layer 20, when all-solid-state battery 100 is charged or discharged, the amount of electron conduction is larger than the amount of lithium ion conduction in proximity to negative-electrode current collector 7. Therefore, in negative electrode layer 30 in the exemplary embodiment, the concentration of conductive assistant 5 in proximity to negative-electrode current collector 7 may be set to be higher than that in proximity to solid electrolyte layer 40. Preferably, the concentration of conductive assistant 5 in proximity to negative-electrode current collector 7 is equal to or greater than 8 times the concentration of conductive assistant 5 in proximity to solid electrolyte layer 40. Thus, it is possible to improve electron conductivity of negative electrode layer 30 during charging or discharging, and favorable charging-and-discharging characteristics are obtained.

A-3. Solvent

In all-solid-state battery 100 according to the exemplary embodiment, concentration of a solvent (specifically, organic solvent) included in at least one layer selected from the group consisting of positive-electrode material mixture layer 21, negative-electrode material mixture layer 31, and solid electrolyte layer 40 may be equal to or smaller than 50 ppm. The concentration of the solvent is preferably equal to or smaller than 30 ppm, and more preferably 0 ppm.

The solvent may be included at least one layer selected from the group consisting of positive-electrode material mixture layer 21, negative-electrode material mixture layer 31, and solid electrolyte layer 40. Examples of the solvent may include a nonpolar solvent, a polar solvent, and a combination thereof. Examples of the nonpolar solvent may include heptane, xylene, toluene, and combinations thereof. Examples of the polar solvent may include a tertiary amine solvent, an ether solvent, a thiol solvent, an ester solvent, and combinations thereof. Examples of the tertiary amine solvent may include triethylamine Examples of the ether solvent may include cyclopentyl methyl ether. Examples of the thiol solvent may include ethane mercaptan. Examples of the ester solvent may include butyl butyrate. In addition, combinations of the above substances may be exemplified.

B. Positive Electrode Layer

Positive electrode layer 20 in the exemplary embodiment will be described with reference to FIG. 2.

Figure 2:
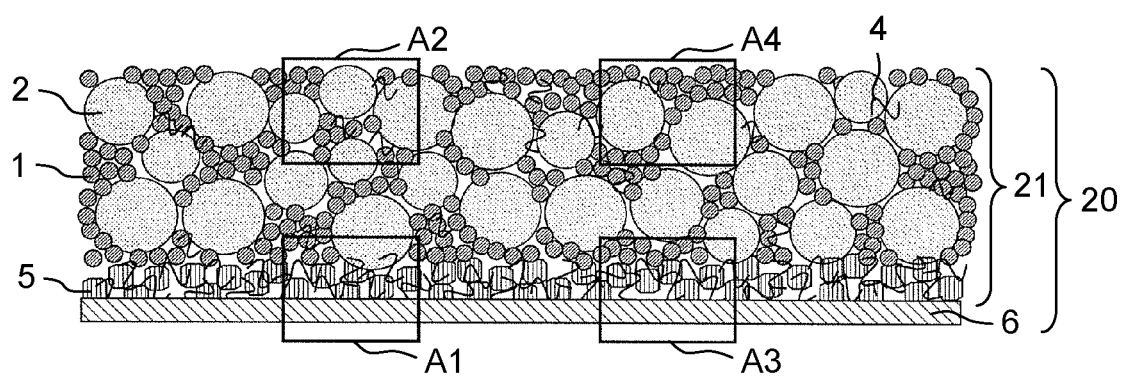
FIG. 2 is a schematic sectional view illustrating a positive electrode layer in the exemplary embodiment.

FIG. 2 is a schematic sectional view illustrating positive electrode layer 20 in the exemplary embodiment. In a thickness direction of positive electrode layer 20 illustrated in FIG. 2, a surface on an opposite side of a surface in contact with positive-electrode current collector 6 is a surface in contact with solid electrolyte layer 40 (not illustrated in FIG. 2).

Positive electrode layer 20 in the exemplary embodiment includes, for example, positive-electrode current collector 6 formed by a metal foil and positive-electrode material mixture layer 21 formed on positive-electrode current collector 6.

B-1. Positive-Electrode Material Mixture Layer

Positive-electrode material mixture layer 21 may include at least positive-electrode active material 2 and binder 4. In all-solid-state battery 100 according to the exemplary embodiment, for example, as illustrated in FIGS. 1 and 2, positive-electrode material mixture layer 21 includes solid electrolyte 1, positive-electrode active material 2, binder 4, and conductive assistant 5.

B-1-1. Binder

Binder 4 in the exemplary embodiment will be described. Binder 4 in the exemplary embodiment is not particularly limited. Specific examples of binder 4 include synthetic rubber as follows, polyvinylidene fluoride (PVDF), polyvinylidene fluoride-hexafluoropropylene copolymer (PVDF-HFP), polyimide, polyamide, polyamideimide, polyvinyl alcohol, and chlorinated polyethylene (CM). Examples of the above synthetic rubber include butadiene rubber, isoprene rubber, styrene-butadiene rubber (SBR), styrene-butadiene-styrene (SBS), styrene-ethylene-butadiene-styrene (SEBS), ethylene-propylene, butyl rubber, chloroprene rubber, acrylonitrile-butadiene rubber, acrylic rubber, silicone rubber, fluorine rubber, and urethane rubber. Binder 4 may be singly used or be used in combination of two kinds or more thereof.

Regarding the concentration of binder 4 included in positive-electrode material mixture layer 21 in the exemplary embodiment, the concentration in proximity to positive-electrode current collector 6 is higher than the concentration in proximity to solid electrolyte layer 40. Specifically, as illustrated in FIG. 2, regarding certain area A1 in proximity to positive-electrode current collector 6 and certain area A2 in proximity to solid electrolyte layer 40, the concentration of binder 4 in area A1 is higher than that in area A2. Preferably, the concentration of binder 4 included in area A1 is equal to or greater than 10 times the concentration of binder 4 included in area A2. More preferably, binder 4 is not provided in area A2.

As described above, since binder 4 is provided so as to have concentration gradient in the thickness direction of positive-electrode material mixture layer 21, it is possible to obtain excellent lithium ion conductivity during charging or discharging and to obtain high adhesion strength between positive-electrode current collector 6 and positive-electrode material mixture layer 21.

Here, a phrase that binder 4 is not provided means that the content of binder 4 is equal to or smaller than 100 ppm.

Area A1 in proximity to positive-electrode current collector 6 may correspond to the entirety of the surface in contact with positive-electrode current collector 6, and area A2 in proximity to solid electrolyte layer 40 may correspond to the entirety of the surface in contact with solid electrolyte layer 40. Area A1 may correspond to a portion of the entirety thereof, and area A2 may correspond to a portion of the entirety thereof. Area A1 and area A2 illustrated in FIG. 2 may overlap each other or may be independently separate from each other.

Durability and battery performance of the all-solid-state battery depending on a change relating to the concentration gradient of binder 4 in positive-electrode material mixture layer 21 will be described below.

In all-solid-state battery 100 according to the exemplary embodiment, regarding the concentration of binder 4 in positive-electrode material mixture layer 21, the concentration in proximity to positive-electrode current collector 6 is higher than that in proximity to solid electrolyte layer 40, in positive-electrode material mixture layer 21. In an all-solid-state battery according to Comparative Example 1, binder 4 is substantially uniformly dispersed in the entirety of positive-electrode material mixture layer 21, and thus the concentration of binder 4 in positive-electrode material mixture layer 21 is uniform.

Figure 4:
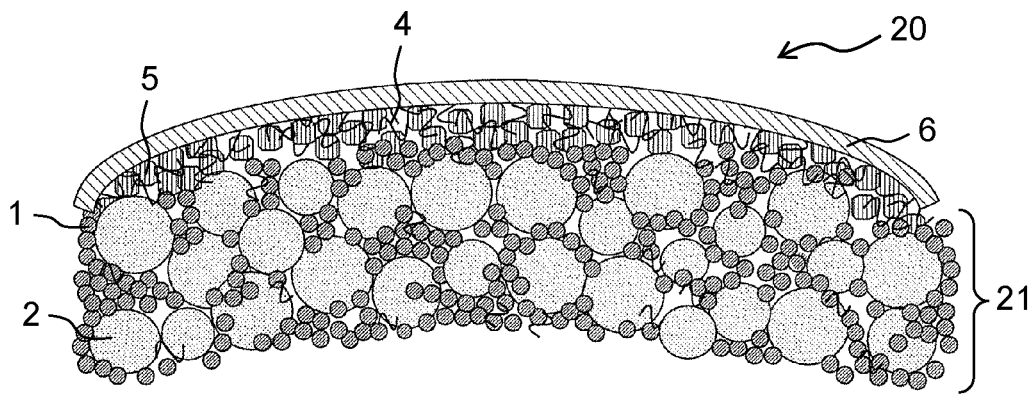
FIG. 4 is a schematic sectional view illustrating a state of the positive electrode layer when the all-solid-state battery according to the exemplary embodiment is bent so as to position a positive-electrode current collector on an outer side and to position a negative-electrode current collector on an inner side.

FIG. 4 is a schematic sectional view illustrating a state of positive electrode layer 20 when all-solid-state battery 100 according to the exemplary embodiment is bent so as to position positive-electrode current collector 6 on an outer side and to position negative-electrode current collector 7 on an inner side. At this time, positive electrode layer 20 is bent so as to cause positive-electrode current collector 6 to have the longest arc shape. Generally, positive-electrode current collector 6 formed by a metal foil has difficulty in being stretched. Thus, positive-electrode material mixture layer 21 and positive-electrode current collector 6 are easily separated from each other.

As described above, in positive-electrode material mixture layer 21 in the exemplary embodiment, the concentration of binder 4 in proximity to positive-electrode current collector 6 is higher than the concentration of binder 4 in proximity to solid electrolyte layer 40. Therefore, it is possible to improve adhesiveness between positive-electrode current collector 6 and positive-electrode material mixture layer 21. Accordingly, as illustrated in FIG. 4, even if all-solid-state battery 100 is bent so as to position positive-electrode current collector 6 on the outer side, it is difficult to separate positive-electrode current collector 6 and positive-electrode material mixture layer 21 from each other. Thus, it is possible to improve electron conductivity of positive electrode layer 20.

Figure 6:
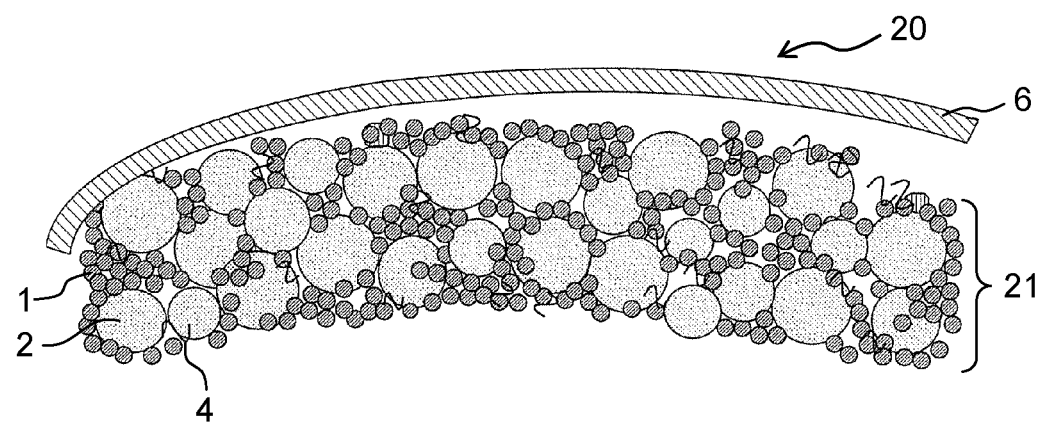
FIG. 6 is a schematic sectional view illustrating a state of a positive electrode layer when an all-solid-state battery according to Comparative Example 1 is bent so as to position a positive-electrode current collector on an outer side and to position a negative-electrode current collector on an inner side.

FIG. 6 is a schematic sectional view illustrating a state of positive electrode layer 20 when the all-solid-state battery according to Comparative Example 1 is bent so as to position positive-electrode current collector 6 on an outer side and to position negative-electrode current collector 7 on an inner side. At this time, positive electrode layer 20 is bent so as to cause positive-electrode current collector 6 to have the longest arc shape. Generally, positive-electrode current collector 6 formed by a metal foil has difficulty in being stretched. Thus, positive-electrode material mixture layer 21 and positive-electrode current collector 6 are easily separated from each other.

As illustrated in FIG. 6, in positive electrode layer 20, binder 4 is substantially uniformly dispersed in the entirety of positive-electrode material mixture layer 21. Thus, the adhesiveness between positive-electrode current collector 6 and positive-electrode material mixture layer 21 is not improved. Accordingly, as illustrated in FIG. 6, if the all-solid-state battery is bent so as to position positive-electrode current collector 6 on the outer side, since the adhesiveness between positive-electrode current collector 6 and positive-electrode material mixture layer 21 is not sufficient, positive-electrode current collector 6 and positive-electrode material mixture layer 21 are easily separated from each other, and it is easy to cut off an electron conduction path in positive electrode layer 20.

Figure 9:
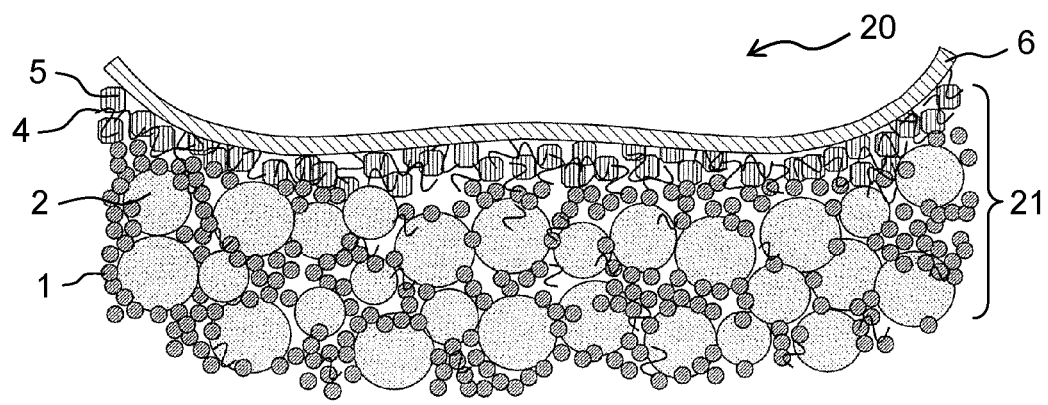
FIG. 9 is a schematic sectional view illustrating a state of the positive electrode layer when the all-solid-state battery in the exemplary embodiment is bent so as to position the positive-electrode current collector on an inner side and to position the negative-electrode current collector on an outer side.

FIG. 9 is a schematic sectional view illustrating a state of positive electrode layer 20 when all-solid-state battery 100 in the exemplary embodiment is bent so as to position positive-electrode current collector 6 on the inner side and to position negative-electrode current collector 7 on the outer side. At this time, since curvature is assigned to positive electrode layer 20, the shape of positive electrode layer 20 is changed to a substantially recess-like shape.

As described above, in positive electrode layer 20 in the exemplary embodiment, the concentration of binder 4 in proximity to positive-electrode current collector 6 is higher than the concentration of binder 4 in proximity to solid electrolyte layer 40. Therefore, it is possible to improve adhesiveness between positive-electrode current collector 6 and positive-electrode material mixture layer 21. Accordingly, as illustrated in FIG. 9, even if curvature is assigned to positive electrode layer 20 in a manner that all-solid-state battery 100 is bent so as to position positive-electrode current collector 6 on the inner side, since positive-electrode material mixture layer 21 easily follows the change of the shape of positive-electrode current collector 6, it is possible to improve electron conductivity of positive electrode layer 20.

With FIGS. 4 and 9, since the configuration of predetermined concentration gradient of binder 4 is applied to positive electrode layer 20 in the exemplary embodiment, durability against an external force of positive electrode layer 20 is improved while favorable charging-and-discharging characteristics of all-solid-state battery 100 are maintained. Accordingly, it is possible to increase the degree of freedom of design for all-solid-state battery 100 in a case where all-solid-state battery 100 is applied to various kinds of equipment.

Figure 11:
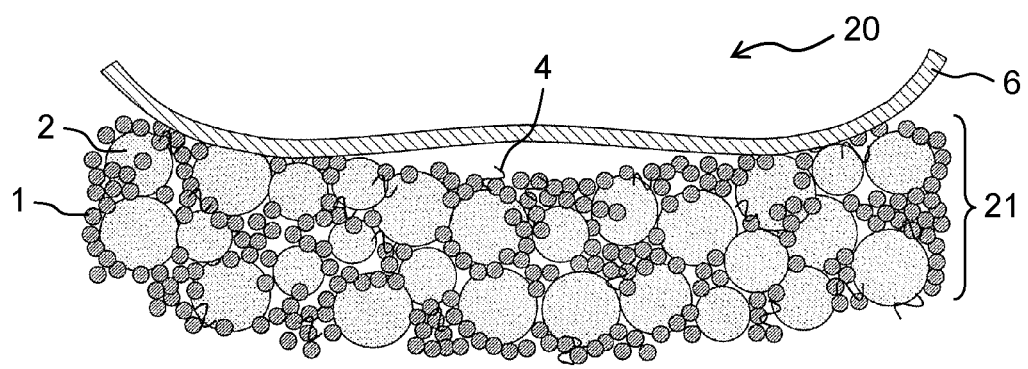
FIG. 11 is a schematic sectional view illustrating a state of the positive electrode layer when the all-solid-state battery according to Comparative Example 1 is bent so as to position the positive-electrode current collector on an inner side and to position the negative-electrode current collector on an outer side.

FIG. 11 is a schematic sectional view illustrating a state of positive electrode layer 20 when the all-solid-state battery according to Comparative Example 1 is bent so as to position positive-electrode current collector 6 on the inner side and to position negative-electrode current collector 7 on the outer side. At this time, since curvature is assigned to positive electrode layer 20, the shape of positive electrode layer 20 is changed to a substantially recess-like shape.

As illustrated in FIG. 11, in positive electrode layer 20, binder 4 is substantially uniformly dispersed in the entirety of positive-electrode material mixture layer 21. Thus, the adhesiveness between positive-electrode current collector 6 and positive-electrode material mixture layer 21 is not improved. Accordingly, as illustrated in FIG. 11, if the all-solid-state battery including positive electrode layer 20 in Comparative Example 1 is bent so as to position positive-electrode current collector 6 on the inner side, since the adhesiveness between positive-electrode current collector 6 and positive-electrode material mixture layer 21 is not sufficient, positive-electrode material mixture layer 21 has difficulty in following the change of the shape of positive-electrode current collector 6, and thus it is easy to cut off the electron conduction path in positive electrode layer 20.

With FIGS. 6 and 11, if binder 4 is substantially uniformly dispersed in positive-electrode material mixture layer 21, durability against an external force of positive electrode layer 20 is deteriorated. Thus, it tends to deteriorate battery characteristics of the all-solid-state battery, such as charging-and-discharging characteristics.

B-1-2. Conductive Assistant

Conductive assistant 5 in the exemplary embodiment will be described below.

Conductive assistant 5 in the exemplary embodiment is not particularly limited so long as conductive assistant 5 causes electron conductivity of positive-electrode material mixture layer 21 to be improved. Examples of conductive assistant 5 include acetylene black, ketchen black, and carbon fiber. Conductive assistant 5 may be singly used or be used in combination of two kinds or more thereof.

As illustrated in FIG. 1, in all-solid-state battery 100 according to the exemplary embodiment, positive-electrode material mixture layer 21 may include conductive assistant 5. Thus, it is possible to increase electron conductivity in positive-electrode material mixture layer 21. Accordingly, it is possible to secure an electron conduction path in positive-electrode material mixture layer 21 and to decrease internal resistance of the all-solid-state battery. Therefore, since the amount of a current which can flow through the electron conduction path is increased, the charging-and-discharging characteristics of the all-solid-state battery is improved.

In the exemplary embodiment, in addition to the concentration of binder 4, the concentration of conductive assistant 5 is also configured so as to have predetermined concentration gradient in the thickness direction of positive-electrode material mixture layer 21. That is, in all-solid-state battery 100 according to the exemplary embodiment, regarding the concentration of conductive assistant 5 included in positive-electrode material mixture layer 21, the concentration in proximity to positive-electrode current collector 6 may be higher than the concentration in proximity to solid electrolyte layer 40.

Specifically, as illustrated in FIG. 2, regarding certain area A3 in proximity to positive-electrode current collector 6 and certain area A4 in proximity to solid electrolyte layer 40, the concentration of conductive assistant 5 in area A3 is higher than that in area A4. Preferably, the concentration of conductive assistant 5 included in area A3 is equal to or greater than 10 times the concentration of conductive assistant 5 included in area A4. This is made for improving electron conductivity between positive-electrode current collector 6 and positive-electrode material mixture layer 21.

Area A3 and area A4 illustrated in FIG. 2 may overlap each other or may be independently separate from each other.

B-1-3. Positive-electrode Active Material

Positive-electrode active material 2 in the exemplary embodiment will be described below.

Positive-electrode active material 2 refers to a material in which lithium (Li) is inserted into or separated from a crystal structure at a potential which is higher than that of negative electrode layer 30, and thus oxidation or reduction is performed. The type of positive-electrode active material 2 is appropriately selected in accordance with the type of all-solid-state battery 100. For example, oxide active material and sulfide active material are exemplified.

As positive-electrode active material 2 in the exemplary embodiment, for example, an oxide active material (lithium-containing transition metal oxide) is used. Examples of the oxide active material include $LiCoO_2$, $LiNiO_2$, $LiMn_2O_4$, $LiCoPO_4$, $LiNiPO_4$, $LiFePO_4$, $LiMnPO_4$, compounds obtained by substituting transition metal of the above compounds with one or two heterogeneous elements. As the compound obtained by substituting the transition metal of the above compound with one or two heterogeneous elements, well-known materials such as $LiNi_{1/3}CO_{1/3}Mn_{1/3}O_2$, $LiNi_{0.8}Co_{0.15}Al_{0.05}O_2$, and $LiNi_{0.5}Mn_{1.5}O_2$. Positive-electrode active material 2 may be singly used or be used in combination of two kinds or more thereof.

Examples of the shape of positive-electrode active material 2 include a particulate shape and a thin-film shape. In a case where positive-electrode active material 2 is particulate, the average particle size ($D_{50}$) thereof is, for example, in a range of equal to or greater than 50 nm and equal to or smaller than 50 μm, and preferably in a range of equal to or greater than 1 μm and equal to or smaller than 15 μm. The reason is as follows. If the average particle size of positive-electrode active material 2 is too small, handling properties may be deteriorated. If the average particle size thereof is too large, it may be difficult to obtain a flat positive electrode layer 20. In this specification, "the average particle size" refers to an average size on the basis of the volume, which is measured by a laser analysis and scattering type particle size distribution measuring device.

The content of positive-electrode active material 2 in positive-electrode material mixture layer 21 is not particularly limited. For example, the content of positive-electrode active material 2 is preferably in a range of equal to or greater than 40 weight % and equal to or smaller than 99 weight %, and more preferably in a range of equal to or greater than 70 weight % and equal to or smaller than 95 weight %.

The surface of positive-electrode active material 2 may be coated with a coat layer. The reason is that it is possible to suppress an occurrence of a reaction between the positive-electrode active material (for example, oxide active material) 2 and the solid electrolyte (for example, sulfide solid electrolyte) 1. Examples of the material of the coat layer may include Li ion conductive oxide such as $LiNbO_3$, $Li_3PO_4$, and LiPON. The average thickness of the coat layer is, for example, preferably in a range of equal to or greater than 1 nm and equal to or smaller than 20 nm, and more preferably in a range of equal to or greater than 1 nm and equal to or smaller than 10 nm.

The ratio between positive-electrode active material 2 and solid electrolyte 1 which are included in positive-electrode material mixture layer 21 is preferably in a range of the positive-electrode active material/solid electrolyte which is equal to or greater than 1 and equal to or smaller than 19 in terms of weight, and more preferably in a range of equal to or greater than 70/30 to equal to or smaller than 19. This is made for securing both a lithium ion conduction path and an electron conduction path in positive-electrode material mixture layer 21.

B-1-4. Solid Electrolyte

Solid electrolyte 1 in the exemplary embodiment will be described below.

As illustrated in FIG. 1, positive-electrode material mixture layer 21 in the exemplary embodiment contains solid electrolyte 1 in addition to positive-electrode active material 2 and binder 4. Solid electrolyte 1 may be appropriately selected in accordance with the conducting ion type (for example, lithium ion). For example, solid electrolyte 1 can be roughly classified into a sulfide-based solid electrolyte and an oxide-based solid electrolyte.

In the exemplary embodiment, the kind of the sulfide-based solid electrolyte is not particularly limited. $Li_2S$—$SiS_2$, $LiI$—$Li_2S$—$SiS_2$, $LiI$—$Li_2S$—$P_2S_5$, $LiI$—$Li_2S$—$P_2O_5$, $LiI$—$Li_3PO_4$—$P_2S_5$, and $Li_2S$—$P_2S_5$ are exemplified. In particular, the sulfide-based solid electrolyte preferably includes Li, P, and S. The reason is that lithium ion conductivity is excellent. The sulfide-based solid electrolyte may be singly used or be used in combination of two kinds or more thereof. The sulfide solid electrolyte may be crystalline or amorphous. The sulfide solid electrolyte may be glass ceramics. The description of "$Li_2S$—$P_2S_5$" means a sulfide solid electrolyte using a raw material composition which includes $Li_2S$ and $P_2S_5$. Other descriptions are similarly applied.

In the exemplary embodiment, one form of the sulfide-based solid electrolyte is sulfide glass ceramic which includes $Li_2S$ and $P_2S_5$. The ratio of $Li_2S$ and $P_2S_5$ is preferably in a range of $Li_2S/P_2S_5$ which is equal to or greater than 70/30 and equal to or smaller than 4 in terms of mol, and more preferably in a range of equal to or greater than 3 and equal to or smaller than 4. This is made for obtaining a crystal structure having high ion conductivity while lithium concentration which influences the battery characteristics is maintained. In addition, this is made for securing the amount of $P_2S_5$ enough for reacting with and being bonded to the binder.

Examples of the shape of the sulfide solid electrolyte in the exemplary embodiment include a particle-like shape such as a spherical shape and an oval spherical shape, and a thin-film shape. In a case where the material of the sulfide solid electrolyte is a particle-like shape, the average particle size ($D_{50}$) thereof is not particularly limited. The average particle size ($D_{50}$) is preferably equal to or smaller than 40 μm, more preferably equal to or smaller than 20 μm, and further preferably equal to or smaller than 10 μm. This is made for easily improving a filling factor of the positive electrode layer. The average particle size is preferably equal to or greater than 0.01 μm and more preferably equal to or greater than 0.1 μm. The average particle size may be determined, for example, by a particle size distribution meter.

The oxide-based solid electrolyte in the exemplary embodiment will be described. The type of the oxide-based solid electrolyte is not particularly limited, and LiPON, $Li_3PO_4$, $Li_2SiO_2$, $Li_2SiO_4$, $Li_{0.5}La_{0.5}TiO_3$, $Li_{1.3}Al_{0.3}Ti_{0.7}(PO_4)_3$, $La_{0.51}Li_{0.34}TiO_{0.74}$, and $Li_{1.5}Al_{0.5}Ge_{1.5}(PO_4)_3$ are exemplified. The oxide-based solid electrolyte may be singly used or be used in combination of two kinds or more thereof.

B-2. Positive-Electrode Current Collector

Positive electrode layer 20 in the exemplary embodiment includes, for example, positive-electrode current collector 6 formed by a metal foil. For example, a foil-like object, a plate-like object, a mesh-like object, and the like which are formed of aluminum, gold, platinum, zinc, copper, SUS, nickel, tin, titanium, an alloy of two kinds or more thereof, or the like are used in positive-electrode current collector 6.

The thickness, the shape, and the like of positive-electrode current collector 6 may be appropriately selected in accordance with the use of the all-solid-state battery.

C. Negative Electrode Layer

Figure 3:
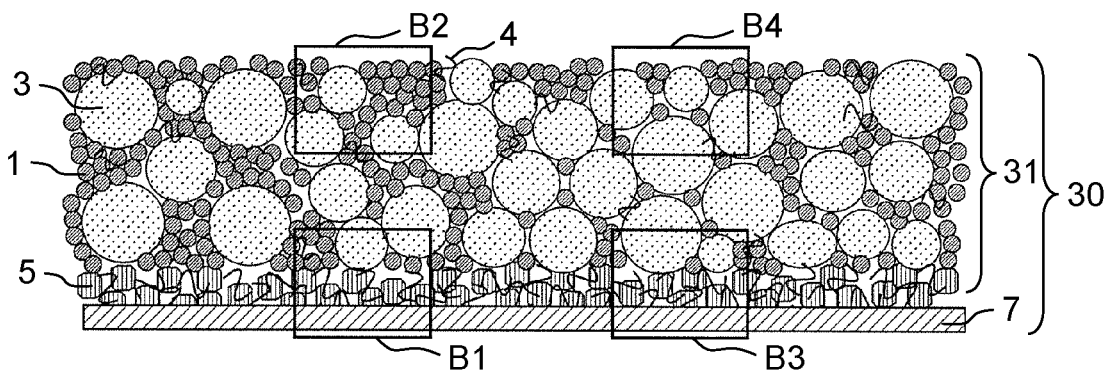
FIG. 3 is a schematic sectional view illustrating a negative electrode layer in the exemplary embodiment.

Negative electrode layer 30 in the exemplary embodiment will be described with reference to FIG. 3. FIG. 3 is a schematic sectional view illustrating negative electrode layer 30 in the exemplary embodiment. In a thickness direction of negative electrode layer 30 illustrated in FIG. 3, a surface on an opposite side of a surface in contact with negative-electrode current collector 7 is a surface in contact with solid electrolyte layer 40 (not illustrated in FIG. 3).

Negative electrode layer 30 in the exemplary embodiment includes, for example, negative-electrode current collector 7 formed by a metal foil and negative-electrode material mixture layer 31 formed on negative-electrode current collector 7.

C-1. Negative-electrode Material Mixture Layer

Negative-electrode material mixture layer 31 may include at least negative-electrode active material 3 and binder 4. In all-solid-state battery 100 according to the exemplary embodiment, for example, as illustrated in FIGS. 1 and 3, negative-electrode material mixture layer 31 includes solid electrolyte 1, negative-electrode active material 3, binder 4, and conductive assistant 5.

C-1-1. Binder

Since the type of binder 4 is the same as that described above in the section of "B. Positive Electrode Layer", descriptions thereof here will not be repeated.

Regarding the concentration of binder 4 included in negative-electrode material mixture layer 31 in the exemplary embodiment, the concentration in proximity to negative-electrode current collector 7 is higher than that in proximity to solid electrolyte layer 40. Specifically, as illustrated in FIG. 3, regarding certain area B1 in proximity to negative-electrode current collector 7 and certain area B2 in proximity to solid electrolyte layer 40, the concentration of binder 4 in area B1 is higher than that in area B2. Preferably, the concentration of binder 4 included in area B1 is equal to or greater than 10 times the concentration of binder 4 included in area B2. More preferably, binder 4 is not provided in area B2.

As described above, since binder 4 is provided so as to have concentration gradient in the thickness direction of negative-electrode material mixture layer 31, lithium ion conductivity during charging or discharging is excellent and it is possible to obtain high adhesion strength between negative-electrode current collector 7 and negative-electrode material mixture layer 31.

Here, a phrase that binder 4 is not provided means that the content of binder 4 is equal to or smaller than 100 ppm.

Area B1 in proximity to negative-electrode current collector 7 may correspond to the entirety of the surface in contact with negative-electrode current collector 7. Area B2 in proximity to solid electrolyte layer 40 may correspond to the entirety of the surface in contact with solid electrolyte layer 40. Area B1 may correspond to a portion of the entirety thereof, and area B2 may correspond to a portion of the entirety thereof. Area B1 and area B2 illustrated in FIG. 3 may overlap each other or may be independently separate from each other.

Durability and battery performance of the all-solid-state battery depending on a change relating to the concentration gradient of binder 4 in negative-electrode material mixture layer 31 will be described below.

In all-solid-state battery 100 according to the exemplary embodiment, regarding the concentration of binder 4 in negative-electrode material mixture layer 31, the concentration in proximity to negative-electrode current collector 7 is higher than the concentration in proximity to solid electrolyte layer 40 in negative-electrode material mixture layer 31. In an all-solid-state battery according to Comparative Example 2, binder 4 is substantially uniformly dispersed in the entirety of negative-electrode material mixture layer 31, and thus the concentration of binder 4 in negative-electrode material mixture layer 31 is uniform.

Figure 5:
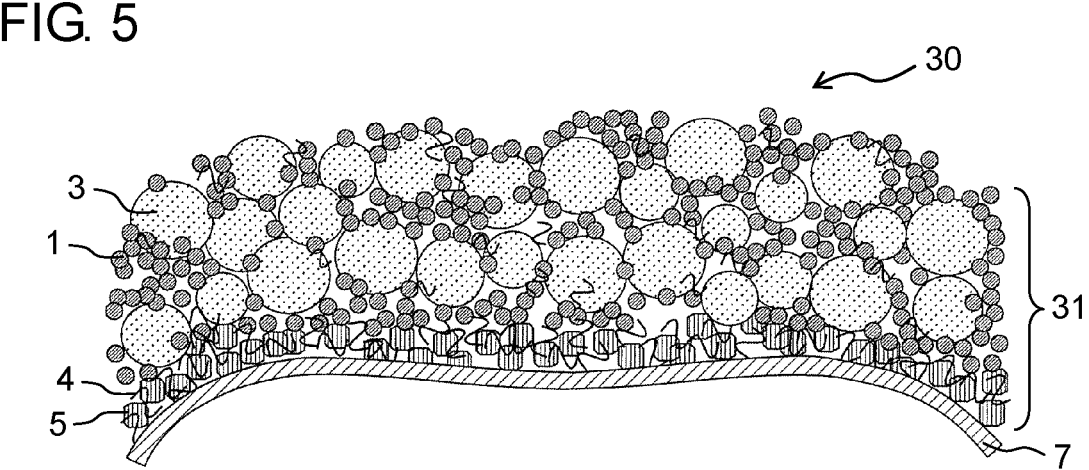
FIG. 5 is a schematic sectional view illustrating a state of the negative electrode layer when the all-solid-state battery according to the exemplary embodiment is bent so as to position the negative-electrode current collector on an inner side and to position the positive-electrode current collector on an outer side.

FIG. 5 is a schematic sectional view illustrating a state of negative electrode layer 30 when all-solid-state battery 100 according to the exemplary embodiment is bent so as to position negative-electrode current collector 7 on the inner side and to position positive-electrode current collector 6 on the outer side. At this time, since curvature is assigned to negative electrode layer 30, the shape of negative electrode layer 30 is changed to a substantially recess-like shape.

As described above, in negative electrode layer 30 in the exemplary embodiment, the concentration of binder 4 in proximity to negative-electrode current collector 7 is higher than the concentration of binder 4 in proximity to solid electrolyte layer 40. Therefore, it is possible to improve adhesiveness between negative-electrode current collector 7 and negative-electrode material mixture layer 31. Accordingly, as illustrated in FIG. 5, even if negative electrode layer 30 is bent by bending all-solid-state battery 100 so as to position negative-electrode current collector 7 on the inner side, since negative-electrode material mixture layer 31 easily follows the change of the shape of negative-electrode current collector 7, it is possible to improve electron conductivity of negative electrode layer 30.

Figure 7:
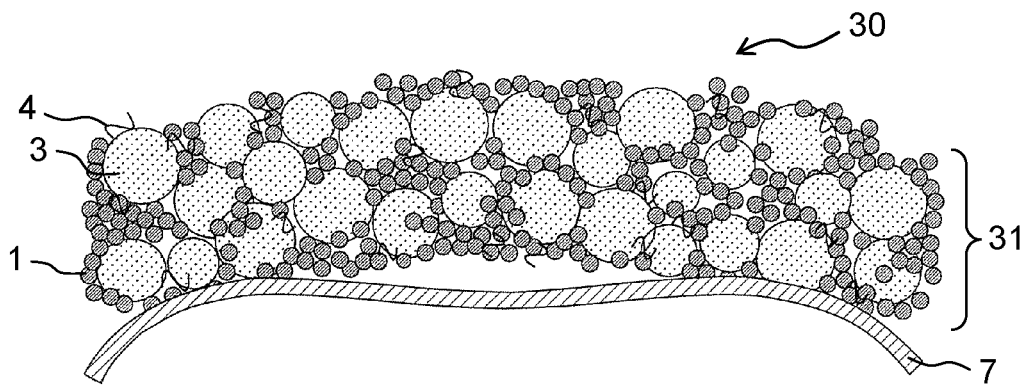
FIG. 7 is a schematic sectional view illustrating a state of a negative electrode layer when an all-solid-state battery according to Comparative Example 2 is bent so as to position a negative-electrode current collector on an inner side and to position a positive-electrode current collector on an outer side.

FIG. 7 is a schematic sectional view illustrating a state of negative electrode layer 30 when the all-solid-state battery according to Comparative Example 2 is bent so as to position negative-electrode current collector 7 on the inner side and to position positive-electrode current collector 6 on the outer side. At this time, since curvature is assigned to negative electrode layer 30, the shape of negative electrode layer 30 is changed to a substantially recess-like shape.

As illustrated in FIG. 7, in negative electrode layer 30, binder 4 is substantially uniformly dispersed in the entirety of negative-electrode material mixture layer 31. Thus, the adhesiveness between negative-electrode current collector 7 and negative-electrode material mixture layer 31 is not sufficient. Accordingly, as illustrated in FIG. 7, if the all-solid-state battery including negative electrode layer 30 in Comparative Example 2 is bent so as to position negative-electrode current collector 7 on the inner side, since the adhesiveness between negative-electrode current collector 7 and negative-electrode material mixture layer 31 is not sufficient, negative-electrode material mixture layer 31 has difficulty in following the change of the shape of negative-electrode current collector 7, and thus it is easy to cut off the electron conduction path in negative electrode layer 30.

Figure 8:
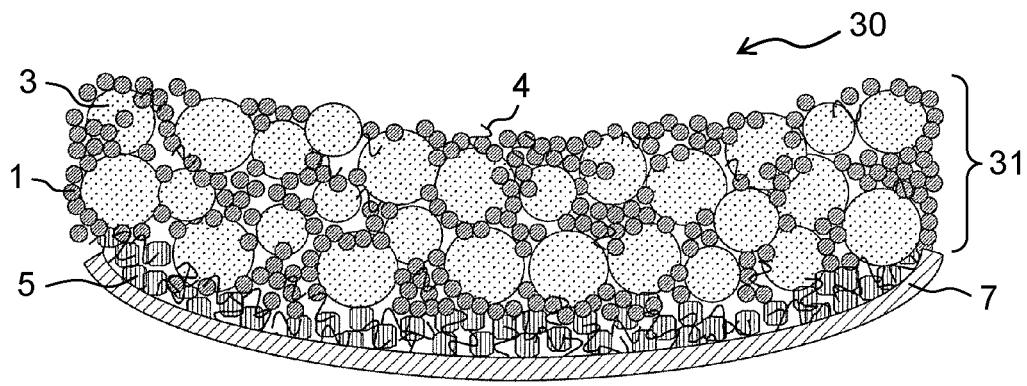
FIG. 8 is a schematic sectional view illustrating a state of the negative electrode layer when the all-solid-state battery in the exemplary embodiment is bent so as to position the negative-electrode current collector on an outer side and to position the positive-electrode current collector on an inner side.

FIG. 8 is a schematic sectional view illustrating a state of negative electrode layer 30 when all-solid-state battery 100 in the exemplary embodiment is bent so as to position negative-electrode current collector 7 on the outer side and to position positive-electrode current collector 6 on the inner side. At this time, negative electrode layer 30 is bent so as to cause negative-electrode current collector 7 to have the longest arc shape. Generally, negative-electrode current collector 7 formed by a metal foil has difficulty in being stretched. Thus, negative-electrode material mixture layer 31 and negative-electrode current collector 7 are easily separated from each other.

As described above, in negative-electrode material mixture layer 31 in the exemplary embodiment, the concentration of binder 4 in proximity to negative-electrode current collector 7 is higher than the concentration of binder 4 in proximity to solid electrolyte layer 40. Therefore, it is possible to improve adhesiveness between negative-electrode current collector 7 and negative-electrode material mixture layer 31. Accordingly, as illustrated in FIG. 8, even if all-solid-state battery 100 is bent so as to position negative-electrode current collector 7 on the outer side, it is difficult to separate negative-electrode current collector 7 and negative-electrode material mixture layer 31 from each other. Thus, it is possible to improve electron conductivity of negative electrode layer 30.

With FIGS. 5 and 8, since the configuration of the predetermined concentration gradient of binder 4 is applied to negative electrode layer 30 in the exemplary embodiment, durability against an external force of negative electrode layer 30 is improved while favorable charging-and-discharging characteristics of all-solid-state battery 100 are maintained. Accordingly, it is possible to increase the degree of freedom of design for all-solid-state battery 100 in a case where all-solid-state battery 100 is applied to various kinds of equipment.

Figure 10:
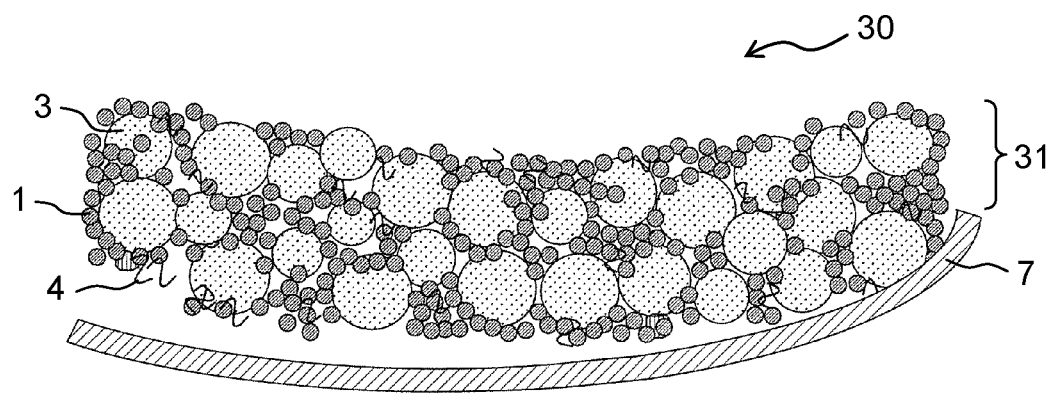
FIG. 10 is a schematic sectional view illustrating a state of the negative electrode layer when the all-solid-state battery according to Comparative Example 2 is bent so as to position the negative-electrode current collector on an outer side and to position the positive-electrode current collector on an inner side.

FIG. 10 is a schematic sectional view illustrating a state of negative electrode layer 30 when the all-solid-state battery according to Comparative Example 2 is bent so as to position negative-electrode current collector 7 on the outer side and to position positive-electrode current collector 6 on the inner side. At this time, negative electrode layer 30 is bent so as to cause negative-electrode current collector 7 to have the longest arc shape. Generally, negative-electrode current collector 7 formed by a metal foil has difficulty in being stretched. Thus, negative-electrode material mixture layer 31 and negative-electrode current collector 7 are easily separated from each other.

As illustrated in FIG. 10, in negative electrode layer 30, binder 4 is substantially uniformly dispersed in the entirety of negative-electrode material mixture layer 31. Thus, the adhesiveness between negative-electrode current collector 7 and negative-electrode material mixture layer 31 is not sufficient. Accordingly, as illustrated in FIG. 10, if the all-solid-state battery is bent so as to position negative-electrode current collector 7 on the outer side and to position positive-electrode current collector 6 on the inner side, since the adhesiveness between negative-electrode current collector 7 and negative-electrode material mixture layer 31 is not sufficient, negative-electrode current collector 7 and negative-electrode material mixture layer 31 are easily separated from each other, and it is easy to cut off an electron conduction path in negative electrode layer 30.

With FIGS. 7 and 10, if binder 4 is substantially uniformly dispersed in negative-electrode material mixture layer 31, durability against an external force of negative electrode layer 30 is deteriorated, and it tends to deteriorate the battery characteristics of the all-solid-state battery, such as the charging-and-discharging characteristics.

In the exemplary embodiment illustrated in FIGS. 1 to 3, when all-solid-state battery 100 is connected to external equipment, in a case where all-solid-state battery 100 is bent for convenience of design, a case where all-solid-state battery 100 is bent so as to position negative-electrode current collector 7 of negative electrode layer 30 on the outer side and to position positive-electrode current collector 6 of positive electrode layer 20 on the inner side is more favorable than a case where the all-solid-state battery 100 is bent so as to position positive-electrode current collector 6 of positive electrode layer 20 on the outer side and to position negative-electrode current collector 7 of negative electrode layer 30 on the inner side.

Generally, negative-electrode active material 3 included in negative electrode layer 30 is easily stretched, but positive-electrode active material 2 included in positive electrode layer 20 has difficulty in being stretched. Therefore, in a case where bending is performed so as to position negative electrode layer 30 on the outer side, it is easy to follow the change of the shape, and it is possible to reduce the amount of binder 4 in an area of positive-electrode material mixture layer 21 in proximity to positive-electrode current collector 6 and the amount of binder 4 in an area of negative-electrode material mixture layer 31 in proximity to negative-electrode current collector 7. As a result, it is possible to suppress a decrease of battery capacity or an increase of internal resistance which is caused by binder 4, and excellent battery characteristics, for example, improvement of the charging-and-discharging characteristics of all-solid-state battery 100 are obtained.

C-1-2. Conductive Assistant

Conductive assistant 5 in the exemplary embodiment will be described below. Since the type of conductive assistant 5 is the same as that described above in the section of "B. Positive Electrode Layer", descriptions thereof here will not be repeated.

As illustrated in FIG. 1, in all-solid-state battery 100 according to the exemplary embodiment, negative-electrode material mixture layer 31 may include conductive assistant 5. Thus, it is possible to increase electron conductivity in negative-electrode material mixture layer 31. Accordingly, it is possible to secure an electron conduction path in negative-electrode material mixture layer 31 and to decrease the internal resistance of all-solid-state battery 100. Therefore, since the amount of a current which can flow through the electron conduction path is increased, the charging-and-discharging characteristics of all-solid-state battery 100 is improved.

In the exemplary embodiment, in addition to the concentration of binder 4, the concentration of conductive assistant 5 is also configured so as to have predetermined concentration gradient in the thickness direction of negative-electrode material mixture layer 31. That is, in all-solid-state battery 100 according to the exemplary embodiment, regarding the concentration of conductive assistant 5 included in negative-electrode material mixture layer 31, the concentration in proximity to negative-electrode current collector 7 may be higher than the concentration in proximity to solid electrolyte layer 40.

Specifically, as illustrated in FIG. 3, regarding certain area B3 in proximity to negative-electrode current collector 7 and certain area B4 in proximity to the solid electrolyte layer, the concentration of conductive assistant 5 in area B3 is higher than that in area B4. Preferably, the concentration of conductive assistant 5 included in area B3 is equal to or greater than 8 times the concentration of conductive assistant 5 included in area B4. This is made for improving electron conductivity between negative-electrode current collector 7 and negative-electrode material mixture layer 31.

When all-solid-state battery 100 is charged or discharged, the amount of electron conduction occurring is larger than the amount of lithium ion conduction occurring in proximity to negative-electrode current collector 7. Therefore, in negative electrode layer 30 in the exemplary embodiment, if the concentration of conductive assistant 5 in proximity to negative-electrode current collector 7 may be set to be higher than that in proximity to solid electrolyte layer 40, it is possible to decrease internal resistance of negative-electrode material mixture layer 31 in proximity to negative-electrode current collector 7. Accordingly, it is possible to improve output characteristics of all-solid-state battery 100.

Area B3 and area B4 may overlap each other or may be independently separate from each other.

C-1-3. Negative-electrode Active Material

Negative-electrode active material 3 in the exemplary embodiment will be described. Negative-electrode active material 3 refers to a material in which lithium is inserted into or separated from a crystal structure at a potential which is lower than that of positive electrode layer 20, and thus oxidation or reduction is performed.

As negative-electrode active material 3 in the exemplary embodiment, for example, well-known materials such as lithium, indium, easy alloyed metal (such as tin and silicon) with lithium, carbon materials (such as hard carbon and graphite), or oxide active materials (such as $Li_4Ti_5O_{12}$ and $SiO_x$) are used. A complex and the like obtained by appropriately mixing the above-described negative-electrode active materials may be also used.

The ratio between negative-electrode active material 3 and solid electrolyte 1 which are included in negative-electrode material mixture layer 31 is preferably in a range of the negative-electrode active material/solid electrolyte which is equal to or greater than 40/60 and equal to or smaller than 19 in terms of weight, and more preferably in a range of equal to or greater than 1 to equal to or smaller than 85/15. This is made for securing both a lithium ion conduction path and an electron conduction path in negative-electrode material mixture layer 31.

C-1-4. Solid Electrolyte

Since descriptions of solid electrolyte 1 are the same as those described above in the section of "B. Positive Electrode Layer", the descriptions thereof here will not be repeated.

C-2. Negative-electrode Current Collector

Negative electrode layer 30 in the exemplary embodiment includes, for example, negative-electrode current collector 7 formed by a metal foil. For example, a foil-like object, a plate-like object, a mesh-like object, and the like which are formed of SUS, gold, platinum, zinc, copper, nickel, titanium, tin, an alloy of two kinds or more thereof, or the like are used in negative-electrode current collector 7.

The thickness, the shape, and the like of negative-electrode current collector 7 may be appropriately selected in accordance with the use of the all-solid-state battery.

D. Solid Electrolyte Layer

Solid electrolyte layer 40 in the exemplary embodiment will be described. Solid electrolyte layer 40 includes at least solid electrolyte 1 having lithium ion conductivity. Solid electrolyte layer 40 may include binder 4 in order to improve adhesion strength of solid electrolyte 1.

D-1. Binder

Since the type of binder 4 is the same as that described above in the section of "B. Positive Electrode Layer", descriptions thereof here will not be repeated.

The content of binder 4 in solid electrolyte layer 40 is preferably equal to or smaller than 1 wt % of solid electrolyte 1, and more preferably equal to or smaller than 0.5 wt % thereof. Further preferably, binder 4 is not provided in solid electrolyte layer 40. This is because binder 4 hinders lithium ion conduction of solid electrolyte layer 40, and thus the charging-and-discharging characteristics of all-solid-state battery 100 are deteriorated. Here, a phrase that binder 4 is not provided means that the content of binder 4 is equal to or smaller than 100 ppm.

D-2. Solid Electrolyte

Since descriptions of solid electrolyte 1 are the same as those described above in the section of "B. Positive Electrode Layer", the descriptions thereof here will not be repeated.

E. Other Components

Although not illustrated, all-solid-state battery 100 according to the exemplary embodiment is attached by welding a terminal (metal positive electrode lead) on a surface of positive-electrode current collector 6 on an opposite side of positive-electrode material mixture layer 21, and is attached by welding a terminal (metal negative electrode lead) on a surface of negative-electrode current collector 7 on an opposite side of negative-electrode material mixture layer 31. All-solid-state battery 100 obtained in this manner or a battery group obtained by connecting a plurality of all-solid-state batteries with each other may be stored in a battery case. The positive electrode lead and the negative electrode lead may be drawn to the outside of the battery case, and the battery case may be sealed.

Here, as the battery case, for example, a bag formed by an aluminum laminate film or the like and a case which is made of metal (for example, SUS, iron, and aluminum) or resin and has any shape are used.

F. Manufacturing Method

F-1. Manufacturing Method of all-Solid-State Battery

A manufacturing method of all-solid-state battery 100 according to the exemplary embodiment includes a film formation process, a stacking process, and a pressing process. In the film formation process, positive electrode layer 20, negative electrode layer 30, and solid electrolyte layer 40 are prepared. In the stacking process, positive electrode layer 20, negative electrode layer 30, and solid electrolyte layer 40 which have been prepared are aligned or stacked so as to cause solid electrolyte layer 40 to be disposed between positive-electrode material mixture layer 21 and negative-electrode material mixture layer 31. In the pressing process, pressing is performed.

Descriptions of the film formation process are the same as description which will be made later in the section of a manufacturing method of each of the layers.

In the pressing process, positive electrode layer 20, negative electrode layer 30, and solid electrolyte layer 40 which have been obtained by the film formation process are stacked so as to cause solid electrolyte layer 40 to be disposed between positive-electrode material mixture layer 21 and negative-electrode material mixture layer 31. Then, pressing is performed from the outside of positive-electrode current collector 6 and negative-electrode current collector 7, for example, at 4 ton/cm$^2$, thereby all-solid-state battery 100 is obtained. The filling factors of positive-electrode material mixture layer 21, negative-electrode material mixture layer 31, and solid electrolyte layer 40 are increased by the pressing process. Since the filling factors are increased, it is possible to improve the lithium ion conductivity and the electron conductivity in positive-electrode material mixture layer 21, negative-electrode material mixture layer 31, and solid electrolyte layer 40, and favorable battery characteristics are obtained.

The filling factor means a proportion of the volume of all substances occupying an object to the apparent volume of the object. For example, the filling factor of positive-electrode material mixture layer 21 means a proportion of the volume of all substances constituting positive-electrode material mixture layer 21, to the apparent volume of positive-electrode material mixture layer 21. The pressing pressure is not limited to 4 ton/cm$^2$. Pressing pressure which allows the filling factor of each of the layers to be adjusted in a desired range may be appropriately selected.

F-2. Manufacturing Method of Positive Electrode Layer

Examples of a manufacturing method of positive electrode layer 20 in the exemplary embodiment may include two methods as follows.

(1) Positive electrode layer 20 in the exemplary embodiment may be manufactured, for example, by a manufacturing method (above-described film formation process) which includes a coating process, a drying and firing process, and a pressing process. In the coating process, a slurry is produced in a manner that solid electrolyte 1, positive-electrode active material 2, binder 4, and conductive assistant 5 are dispersed in an organic solvent, and the surface of positive-electrode current collector 6 is coated with the obtained slurry. In the drying and firing process, the coated film obtained by the coating process is heated and dried so as to remove the organic solvent. In the pressing process, the dried and coated film which has been formed on positive-electrode current collector 6 is pressed.

In the manufacturing method, positive electrode layer 20 in the exemplary embodiment may also be produced in a manner as follows. A plurality of slurries which include solid electrolyte 1, positive-electrode active material 2, binder 4, and if necessary, conductive assistant 5, and have different concentration of binder 4 and different concentration of conductive assistant 5 are produced. Then, coating is repeated in a manner that positive-electrode current collector 6 is coated and dried with the slurries in an order from the slurry in which the concentration of binder 4 and the concentration of conductive assistant 5 are high.

A coating method with the slurry is not particularly limited. Well-known coating methods of a blade coater, a gravure coater, a dip coater, a reverse coater, a roll knife coater, a wire bar coater, a slot die coater, an air knife coater, a curtain coater, an extrusion coater, and combinations thereof may be employed.

Since the organic solvent used for preparing the slurry is the same as that described above in the section of "A-3. Solvent", descriptions thereof here will not be repeated.

The concentration of the organic solvent included in positive-electrode material mixture layer 21 in the exemplary embodiment may be equal to or smaller than 50 ppm, preferably equal to or smaller than 30 ppm, and more preferably 0 ppm.

A measuring method of the organic solvent is not particularly limited. Examples of the measuring method of the organic solvent may include gas chromatography and a mass change method.

(2) Positive electrode layer 20 in the exemplary embodiment may also be produced, for example, by a manufacturing method (film formation process) which includes a stacking process and a pressing process. In the stacking process, binder 4 and conductive assistant 5 are uniformly disposed on the surface of positive-electrode current collector 6, and then a positive-electrode material mixture is uniformly stacked on the surface of positive-electrode current collector 6. The positive-electrode material mixture is obtained by mixing solid electrolyte 1, positive-electrode active material 2, and if necessary, binder 4 and conductive assistant 5. In the pressing process, a stacked body obtained by the stacking process is pressed.

In the above-described two manufacturing methods, the drying and firing process is not particularly limited, and well-known drying and firing processes may be employed. The pressing process is not particularly limited, and well-known pressing processes may be employed.

The temperature of the drying and firing process is not particularly limited. For example, a temperature in a range of room temperature to 500° C. may be exemplified. The pressing pressure is not particularly limited so long as a predetermined filling factor and the like of positive-electrode material mixture layer 21 can be achieved.

F-3. Manufacturing Method of Negative Electrode Layer

Negative electrode layer 30 in the exemplary embodiment may be produced in a manner similar to the above-described method of positive electrode layer 20 except that a material to be used is changed to a material for negative electrode layer 30.

The concentration of the solvent included in negative-electrode material mixture layer 31 in the exemplary embodiment may be equal to or smaller than 50 ppm, preferably equal to or smaller than 30 ppm, and more preferably 0 ppm.

The measuring method of the organic solvent is as follows.

F-4. Manufacturing Method of Solid Electrolyte Layer

Solid electrolyte layer 40 in the exemplary embodiment may be produced in a manner similar to the above-described method of positive electrode layer 20 except that a slurry is produced in a manner that solid electrolyte 1 and, if necessary, binder 4 are dispersed in an organic solvent, and the obtained slurry is applied onto a base material, and a process of peeling off the base material is provided after the pressing process.

In a case where a solid electrolyte film is produced by applying the slurry onto the base material and drying the resultant, the organic solvent used for preparing the slurry is the same as that described above in the section of "A-3. Solvent". Thus, descriptions thereof here will not be repeated. The organic solvent used for preparing the slurry is not particularly limited so long as the organic solvent does not have a negative influence on performance of a solid electrolyte. For example, heptane, toluene, and hexane of a hydrocarbon-based organic solvent are exemplified. Preferably, a hydrocarbon-based organic solvent having a reduced moisture content by performing a dehydration treatment is used.

The base material is not particularly limited so long as a solid electrolyte film can be formed on the base material. A base material which has a film-like shape and has flexibility, a hard base material, and the like may be used. For example, a base material of TEFLON (registered trademark), a polyethylene terephthalate (PET) film, or the like may be used.

The concentration of the solvent included in solid electrolyte layer 40 in the exemplary embodiment may be equal to or smaller than 50 ppm and preferably 0 ppm.

The measuring method of the organic solvent is as follows.

The disclosure is not limited to the exemplary embodiment. The exemplary embodiment is just an example. Anything which has substantially the same components as the technical idea and exhibits the similar advantageous effect within the scope of claims of the disclosure is included in the technical scope of the disclosure.

EXAMPLES

Examples of the exemplary embodiment will be described below. However, the exemplary embodiment of the disclosure is not limited to the examples. Each of the examples was performed in a glove box or a dry room in which the dew point was managed to be equal to or lower than −45° C., so long as particular statements are not made.

Preparation of Solid Electrolyte

Firstly, a solid electrolyte $Li_2S$—$P_2S_5$ was produced. $Li_2S$ and $P_2S_5$ were weighed so as to obtain $Li_2S:P_2S_5=75:25$, were pulverized by using a mortar, and then were mixed. Then, a milling treatment was performed by a planetary ball mill for 10 hours, and thereby a solid electrolyte of a glass state was obtained. Then, an annealing treatment was performed on the obtained solid electrolyte of the glass state in an atmosphere of an inert gas, and thereby a solid electrolyte of a glass ceramic state was obtained. An annealing treatment temperature was determined with reference to a temperature at a crystallization peak, which was obtained by differential thermal analysis measurement.

Ion conductivity of the obtained solid electrolyte was measured by an AC impedance method, and was $7.0 \times 10^{-4}$ S/cm.

Example 1

$LiNi_{0.8}Co_{0.15}Al_{0.05}O_2$ (average particle size: 5 μm) as a positive-electrode active material, and the solid electrolyte $75Li_2S$-$25P_2S_5$ of a glass ceramic state were prepared and were mixed by a mortar. A film was formed on a copper foil on which a binder and a conductive assistant were uniformly disposed, by using the obtained powder. Then, pressing was performed, and thereby a positive electrode layer in Example 1 was produced.

In Example 1, the positive electrode layer was produced by the manufacturing method (2) described in the section of "F-2. Manufacturing Method of Positive Electrode Layer". In this case, since the organic solvent is not used, the concentration of the organic solvent included in the positive electrode layer is 0 ppm.

Comparative Example 1

A positive electrode layer in Comparative Example 1 was produced by a method which was the same as that in Example 1 except that the binder and the conductive assistant were not disposed on the copper foil.

Example 2

Graphite as a negative-electrode active material, and the solid electrolyte $75Li_2S-25P_2S_5$ of a glass ceramic state were prepared and mixed. A film was formed on a copper foil on which a binder and a conductive assistant were uniformly disposed, by using the obtained powder. Then, pressing was performed, and thereby a negative electrode layer in Example 2 was produced.

In Example 2, similar to Example 1, the negative electrode layer was produced by the manufacturing method (2) which did not use an organic solvent. In this case, since the organic solvent is not used, the concentration of the organic solvent included in the negative electrode layer is 0 ppm.

Comparative Example 2

A negative electrode layer in Comparative Example 2 was produced by a method which was the same as that in Example 2 except that the binder and the conductive assistant were not disposed on the copper foil.
Production of all-Solid-State Battery An all-solid-state battery including the positive electrode layer, the solid electrolyte layer, and the negative electrode layer was produced by using the layers (positive electrode layer and the negative electrode layer) obtained in Examples 1 and 2, and Comparative Examples 1 and 2.
Evaluation of Adhesiveness In the all-solid-state battery using the positive electrode layer and the negative electrode layer which had been produced in Examples 1 and 2, and Comparative Examples 1 and 2, adhesiveness between the positive-electrode material mixture layer and the corresponding current collector, and adhesiveness between the negative-electrode material mixture layer and the corresponding current collector were evaluated. The adhesiveness was evaluated in a manner that the all-solid-state battery was wound around a round bar having a diameter of 10 mm, and the degree of crack occurring between the positive-electrode material mixture layer and the corresponding current collector and between the negative-electrode material mixture layer and the corresponding current collector was visually observed. Table 1 shows results. "A" is assigned to a case where no crack occurs and strong adhesiveness is shown. "B" is assigned to a case where crack occurs at a portion of the all-solid-state battery and medium adhesiveness is shown. "C" is assigned to a case where cracks occur in the entirety thereof and weak adhesiveness is shown.

TABLE 1

| | Layer | Evaluation of adhesion strength |
| --- | --- | --- |
| Example 1 | Positive electrode layer | A |
| Example 2 | Negative electrode layer | A |
| Comparative Example 1 | Positive electrode layer | B |
| Comparative Example 2 | Negative electrode layer | C |

As shown in Table 1, adhesion strength was high in both Examples 1 and 2. It is considered that the reason is that the binder disposed in proximity to the current collector caused the adhesion strength to be improved. However, since the binder is not disposed in proximity to the current collector in Comparative Examples 1 and 2, the adhesion strength between the current collector and the material mixture layer was low.
Measurement of Electron Conductivity In the all-solid-state battery which used the positive electrode layer obtained in each of Example 1 and Comparative Example 1, and the negative electrode layer obtained in each of Example 2 and Comparative Example 2, electron conductivity was measured.

If a case in Example 1 was compared to a case in Comparative Example 1, a large change did not occur. The reason is considered as follows. In Example 1, the concentration of the binder in proximity to the current collector is high, and the electron conductivity is hindered by the binder. However, regarding the total concentration of the conductive assistant for securing the electron conductivity, the concentration in proximity to the current collector is high. Similarly, if a case in Example 2 was compared to a case in Comparative Example 2, a large change did not occur. The reason is considered as follows. In Example 2, the concentration of the binder in proximity to the current collector is high, and the electron conductivity is hindered by the binder. However, regarding the total concentration of the conductive assistant for securing the electron conductivity, the concentration in proximity to the current collector is high.

With the evaluation of the adhesiveness and the evaluation of the electron conductivity, it was understood that an all-solid-state battery which achieved both high adhesiveness and excellent battery characteristics was obtained in Examples 1 and 2.

As described above, all-solid-state battery 100 according to the exemplary embodiment includes positive-electrode current collector 6, positive electrode layer 20, negative-electrode current collector 7, negative electrode layer 30, and solid electrolyte layer 40. Positive electrode layer 20 is formed on positive-electrode current collector 6 and includes positive-electrode material mixture layer 21 which includes at least positive-electrode active material 2 and binder 4. Negative electrode layer 30 is formed on negative-electrode current collector 7 and includes negative-electrode material mixture layer 31 which includes at least negative-electrode active material 3 and binder 4. Solid electrolyte layer 40 is disposed between positive-electrode material mixture layer 21 and negative-electrode material mixture layer 31, and includes at least solid electrolyte 1 having ion conductivity. The concentration of the solvent included in at least one layer selected from the group consisting of positive-electrode material mixture layer 21, negative-electrode material mixture layer 31, and solid electrolyte layer 40 is equal to or smaller than 50 ppm. Regarding the concentration of binder 4 included in at least one layer selected from positive-electrode material mixture layer 21 and negative-electrode material mixture layer 31, the concentration in proximity to positive-electrode current collector 6 or negative-electrode current collector 7 is higher than the concentration in proximity to solid electrolyte layer 40.

In all-solid-state battery 100 according to the exemplary embodiment, the concentration of the solvent (organic solvent) included in at least one layer selected from the group consisting of positive-electrode material mixture layer 21, negative-electrode material mixture layer 31, and solid electrolyte layer 40 is equal to or smaller than 50 ppm. Since, substantially, the solvent is not included, an environmental load is small. In all-solid-state battery 100 according to the exemplary embodiment, regarding the concentration of binder 4 included in at least one layer selected from positive-electrode material mixture layer 21 and negative-electrode material mixture layer 31, the concentration in proximity to positive-electrode current collector 6 or negative-electrode current collector 7 is higher than the concentration in proximity to solid electrolyte layer 40, and binder 4 has predetermined concentration gradient in the thickness direction of all-solid-state battery 100. Thus, it is possible to achieve both high adhesion strength and excellent battery characteristics (for example, charging-and-discharging characteristics).

In all-solid-state battery 100 according to the exemplary embodiment, positive-electrode material mixture layer 21 may include conductive assistant 5. Thus, it is possible to increase electron conductivity in positive-electrode material mixture layer 21. Accordingly, it is possible to secure an electron conduction path in positive-electrode material mixture layer 21.

In all-solid-state battery 100 according to the exemplary embodiment, regarding the concentration of conductive assistant 5 included in positive-electrode material mixture layer 21, the concentration in proximity to positive-electrode current collector 6 may be higher than the concentration in proximity to solid electrolyte layer 40. The concentration gradient is provided so as to cause the content of conductive assistant 5 in proximity to positive-electrode current collector 6 to be high, and thus it is possible to decrease the internal resistance of positive-electrode material mixture layer 21 in proximity to positive-electrode current collector 6. Accordingly, it is possible to improve output characteristics of all-solid-state battery 100.

Further, in all-solid-state battery 100 according to the exemplary embodiment, negative-electrode material mixture layer 31 may include conductive assistant 5. Thus, it is possible to increase electron conductivity in negative-electrode material mixture layer 31. Accordingly, it is possible to secure an electron conduction path in negative-electrode material mixture layer 31.

In all-solid-state battery 100 according to the exemplary embodiment, regarding the concentration of conductive assistant 5 included in negative-electrode material mixture layer 31, the concentration in proximity to negative-electrode current collector 7 may be higher than the concentration in proximity to solid electrolyte layer 40. The concentration gradient is provided so as to cause the content of conductive assistant 5 in proximity to negative-electrode current collector 7 to be high, and thus it is possible to decrease the internal resistance of negative-electrode material mixture layer 31 in proximity to negative-electrode current collector 7. Accordingly, it is possible to improve output characteristics of all-solid-state battery 100.

Hitherto, the all-solid-state battery according to the disclosure is described based on the exemplary embodiment and the examples. However, the disclosure is not limited to the exemplary embodiment and the examples. In range without departing from the main gist of the disclosure, various modifications obtained by the person skilled in the related art are applied to the exemplary embodiment and the examples, and another form constructed by combining some constituent components in the exemplary embodiment and the examples is also included in the range of the disclosure.

According to the disclosure, it is expected that the positive electrode layer, the negative electrode layer, the solid electrolyte layer, and the all-solid-state battery using the above layers are applied to a power supply of portable electronic equipment or the like, or an in-vehicle battery.

What is claimed is:

1. An all-solid-state battery comprising:
a positive electrode layer, a negative electrode layer, and a solid electrolyte layer, wherein
the positive electrode layer includes a positive-electrode current collector and a positive-electrode material mixture layer formed on the positive-electrode current collector, wherein the positive-electrode material mixture layer includes at least a positive-electrode active material and a binder, and a concentration of the binder in proximity to the positive-electrode current collector is equal to or greater than 10 times a concentration of the binder in proximity to the solid electrolyte layer;
the negative electrode layer includes a negative-electrode current collector and a negative-electrode material mixture layer formed on the negative-electrode current collector, wherein the negative-electrode material mixture layer includes at least a negative-electrode active material and a binder, and a concentration of the binder in proximity to the negative-electrode current collector is equal to or greater than 10 times a concentration of the binder in proximity to the solid electrolyte layer; and
the solid electrolyte layer is disposed between the positive electrode layer and the negative electrode layer and includes at least a solid electrolyte having ion conductivity;
concentration of a solvent included in at least one layer selected from the group consisting of the positive-electrode material mixture layer, the negative-electrode material mixture layer, and the solid electrolyte layer is equal to or smaller than 50 ppm;
wherein the positive-electrode material mixture layer includes a conductive assistant both in proximity to the positive-electrode current collector and in proximity to the solid electrolyte layer, and a concentration of the conductive assistant in proximity to the positive-electrode current collector is equal to or greater than 10 times a concentration of the conductive assistant in proximity to the solid electrolyte layer, and
wherein the negative-electrode material mixture layer includes a conductive assistant both in proximity to the negative-electrode current collector and in proximity to the solid electrolyte layer, and a concentration of the conductive assistant in proximity to the negative-electrode current collector is equal to or greater than 8 times a concentration of the conductive assistant in proximity to the solid electrolyte layer.

* * * * *